(12) United States Patent
Sano et al.

(10) Patent No.: US 12,214,463 B2
(45) Date of Patent: Feb. 4, 2025

(54) METHOD OF MANUFACTURING STRUCTURAL OBJECT, IDENTIFIER FOR MANUFACTURING STRUCTURAL OBJECT, STRUCTURAL OBJECT MANUFACTURING SYSTEM, AND MACHINING PROGRAM

(71) Applicant: Kawasaki Railcar Manufacturing Co., Ltd., Kobe (JP)

(72) Inventors: Yukihiro Sano, Kobe (JP); Masashi Yamaguchi, Akashi (JP); Yoshi Sato, Kobe (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 0 days.

(21) Appl. No.: 18/577,715

(22) PCT Filed: Aug. 6, 2021

(86) PCT No.: PCT/JP2021/029320
§ 371 (c)(1),
(2) Date: Jan. 9, 2024

(87) PCT Pub. No.: WO2023/013036
PCT Pub. Date: Feb. 9, 2023

(65) Prior Publication Data
US 2024/0261924 A1     Aug. 8, 2024

(51) Int. Cl.
*B23Q 17/20* (2006.01)
*B23Q 15/22* (2006.01)

(52) U.S. Cl.
CPC ............. *B23Q 17/20* (2013.01); *B23Q 15/22* (2013.01)

(58) Field of Classification Search
CPC ......... G05B 15/02; B23Q 17/20; B23Q 15/22
(Continued)

(56) References Cited

U.S. PATENT DOCUMENTS 4,753,555 A * 6/1988 Thompson .............. B23B 47/28
                                                          408/1 R
6,161,050 A * 12/2000 Jessee ............... G05B 19/40937
                                                           700/83
(Continued)

FOREIGN PATENT DOCUMENTS

| JP | 2006-139506 A | | 6/2006 |
| JP | 2010284732 A | * | 12/2010 |
| TW | 201614224 A | | 4/2016 |

OTHER PUBLICATIONS

Written Opinion mailed on Oct. 26, 2021, received for PCT Application PCT/JP2021/029320, filed on Aug. 6, 2021, 7 pages including English Translation.

*Primary Examiner* — Ronald D Hartman, Jr.
(74) *Attorney, Agent, or Firm* — XSENSUS LLP

(57) ABSTRACT

A method of manufacturing a structural object includes: receiving a data set including workpiece three-dimensional measurement data and first specific information of first identifier three-dimensional measurement data associated with the workpiece three-dimensional measurement data; acquiring second identifier three-dimensional measurement data by measuring a three-dimensional shape of the identifier; reading out the workpiece three-dimensional measurement data from the data set including the first specific information that coincides with second specific information of the second identifier three-dimensional measurement data; and determining a machining plan based on the read workpiece three-dimensional measurement data.

17 Claims, 10 Drawing Sheets

(58) Field of Classification Search
USPC .......................................................... 700/193
See application file for complete search history.

(56) References Cited

U.S. PATENT DOCUMENTS

| | | | |
|---|---|---|---|
| 7,523,561 B2 * | 4/2009 | McFarland | G01B 21/04 |
| | | | 33/554 |
| 8,112,173 B2 * | 2/2012 | Katoh | G05B 19/404 |
| | | | 700/192 |
| 2017/0219499 A1 | 8/2017 | Tanaka et al. | |
| 2021/0181706 A1 * | 6/2021 | Antongiorgi | G01B 21/045 |

* cited by examiner

| IDENTIFICATION INFORMATION | | BIT STREAM DATA OF IDENTIFIER | | | | | | | | | |
|---|---|---|---|---|---|---|---|---|---|---|---|
| DECIMAL NUMBER | BINARY NUMBER | PROJECTION No. 1 | PROJECTION No. 2 | PROJECTION No. 3 | PROJECTION No. 4 | PROJECTION No. 5 | PROJECTION No. 6 | PROJECTION No. 7 | PROJECTION No. 8 | PROJECTION No. 9 | PROJECTION No. 10 |
| 111 | 0001101111 | 0 | 0 | 0 | 1 | 1 | 1 | 1 | 1 | 1 | 1 |
| 112 | 0001110000 | 0 | 0 | 0 | 1 | 1 | 1 | 0 | 0 | 0 | 0 |
| 113 | 0001110001 | 0 | 0 | 0 | 1 | 1 | 1 | 0 | 0 | 0 | 1 |
| 114 | 0001110010 | 0 | 0 | 0 | 1 | 1 | 1 | 0 | 0 | 1 | 0 |
| 115 | 0001110011 | 0 | 0 | 0 | 1 | 1 | 1 | 0 | 0 | 1 | 1 |
| 116 | 0001110100 | 0 | 0 | 0 | 1 | 1 | 1 | 0 | 1 | 0 | 0 |
| ..... | | ..... | ..... | ..... | ..... | ..... | ..... | ..... | ..... | ..... | ..... |

FIG. 9

METHOD OF MANUFACTURING STRUCTURAL OBJECT, IDENTIFIER FOR MANUFACTURING STRUCTURAL OBJECT, STRUCTURAL OBJECT MANUFACTURING SYSTEM, AND MACHINING PROGRAM

CROSS-REFERENCE TO RELATED APPLICATION

The present application is based on PCT filing PCT/JP2021/029320, filed Aug. 6, 2021, the entire content of which is incorporated herein by reference.

TECHNICAL FIELD

The present disclosure relates to a method of manufacturing a structural object, an identifier for manufacturing the structural object, a structural object manufacturing system, and a machining program.

BACKGROUND ART

In the process of manufacturing a structural object, there may be a shape difference between design data of a workpiece as a machining target and the actual workpiece. PTL 1 discloses a system that, to prevent an interference between a machining start point of a machining tool of machining equipment and the workpiece due to such shape difference, measures a three-dimensional shape of the workpiece in advance to acquire three-dimensional measurement data and estimates the interference.

CITATION LIST

Patent Literature

PTL 1: Japanese Laid-Open Patent Application Publication No. 2006-139506

SUMMARY OF INVENTION

Technical Problem

There may be individual differences among the three-dimensional shapes of even the same types of workpieces, and there may be differences among machining allowances of the workpieces. Then, to improve the efficiency of a manufacturing line, there is an idea that in an offline that is outside the manufacturing line, pieces of three-dimensional measurement data of the workpieces are measured in advance, and the pieces of three-dimensional measurement data are stored in a storage. There is a possibility that due to a human input error or the like, machining equipment on the manufacturing line reads out from the storage the three-dimensional measurement data not corresponding to the workpiece to be actually machined among the pieces of three-dimensional measurement data stored in the storage. Introducing a new management facility to prevent such error increases the cost.

Solution to Problem

A method of manufacturing a structural object according to one aspect of the present disclosure is a method of manufacturing a structural object by using machining equipment including a machining tool. The method includes: receiving a data set including workpiece three-dimensional measurement data acquired by measuring a three-dimensional shape of a workpiece that is a machining target object and first specific information of first identifier three-dimensional measurement data which is acquired by measuring a three-dimensional shape of an identifier attached to the workpiece and is associated with the workpiece three-dimensional measurement data; acquiring second identifier three-dimensional measurement data by measuring the three-dimensional shape of the identifier; reading out the workpiece three-dimensional measurement data from the data set including the first specific information that coincides with second specific information of the acquired second identifier three-dimensional measurement data; and determining a machining plan based on the read workpiece three-dimensional measurement data.

An identifier for use in manufacturing a structural object according to one aspect of the present disclosure is an identifier used to identify a workpiece that is a machining target object. The identifier includes: a base including an adsorbing body detachably attached to the workpiece; projections or recesses located at the base; and adjusters which mechanically change projection amounts of the projections or recess amounts of the recesses and to which specific information of the workpiece is given by the projection amounts or the recess amounts.

A structural object manufacturing system according to one aspect of the present disclosure is a system that manufactures a structural object by using machining equipment including a machining tool and includes: a measurement sensor that measures a three-dimensional shape; and processing circuitry connected to the measurement sensor. The processing circuitry receives a data set including workpiece three-dimensional measurement data acquired by measuring the three-dimensional shape of a workpiece and first specific information of first identifier three-dimensional measurement data which is acquired by measuring the three-dimensional shape of an identifier attached to the workpiece and is associated with the workpiece three-dimensional measurement data. The processing circuitry acquires second identifier three-dimensional measurement data by measuring the three-dimensional shape of the identifier with the measurement sensor. The processing circuitry reads out the workpiece three-dimensional measurement data from the data set including the first specific information that coincides with second specific information of the second identifier three-dimensional measurement data. The processing circuitry determines a machining plan based on the read workpiece three-dimensional measurement data.

A machining program according to one aspect of the present disclosure is a machining program for use in manufacturing a structural object by using machining equipment including a machining tool. The machining program causes at least one processor to execute: receiving a data set including workpiece three-dimensional measurement data acquired by measuring a three-dimensional shape of a workpiece and first specific information of first identifier three-dimensional measurement data which is acquired by measuring a three-dimensional shape of an identifier attached to the workpiece and is associated with the workpiece three-dimensional measurement data; acquiring second specific information of second identifier three-dimensional measurement data by measuring the three-dimensional shape of the identifier with a measurement sensor of the machining equipment; reading out the workpiece three-dimensional measurement data from the data set including the first specific information that coincides with the second specific information of the acquired second identifier three-dimensional measurement data; and determining a machining plan based on the read workpiece three-dimensional measurement data.

The program may be stored in a computer-readable medium. The computer-readable medium is a non-transitory and tangible medium. The computer-readable medium may be a storage medium that is incorporated in or externally attached to a computer. The storage medium may be a RAM, a ROM, an EEPROM, or the like, and for example, may be a hard disk, a flash memory, an optical disk, or the like. The program stored in the storage medium may be executed by a computer to which the storage medium is directly connected, or may be executed by a computer to which the storage medium is connected through a network.

Advantageous Effects of Invention

According to one aspect of the present disclosure, since the machining equipment reads out the previously acquired three-dimensional measurement data of the workpiece based on the identifier attached to the workpiece, the three-dimensional measurement data not corresponding to the workpiece to be actually machined can be prevented from being read out. Since the three-dimensional measurer recognizes the identifier by using the measurement sensor that measures the three-dimensional shape of the workpiece, it is unnecessary to newly prepare a reader that recognizes the identifier, and this can reduce the cost.

BRIEF DESCRIPTION OF DRAWINGS

FIG. 9 is a diagram showing data of identification information.

DESCRIPTION OF EMBODIMENTS

Hereinafter, an embodiment will be described with reference to the drawings.

Figure 1:
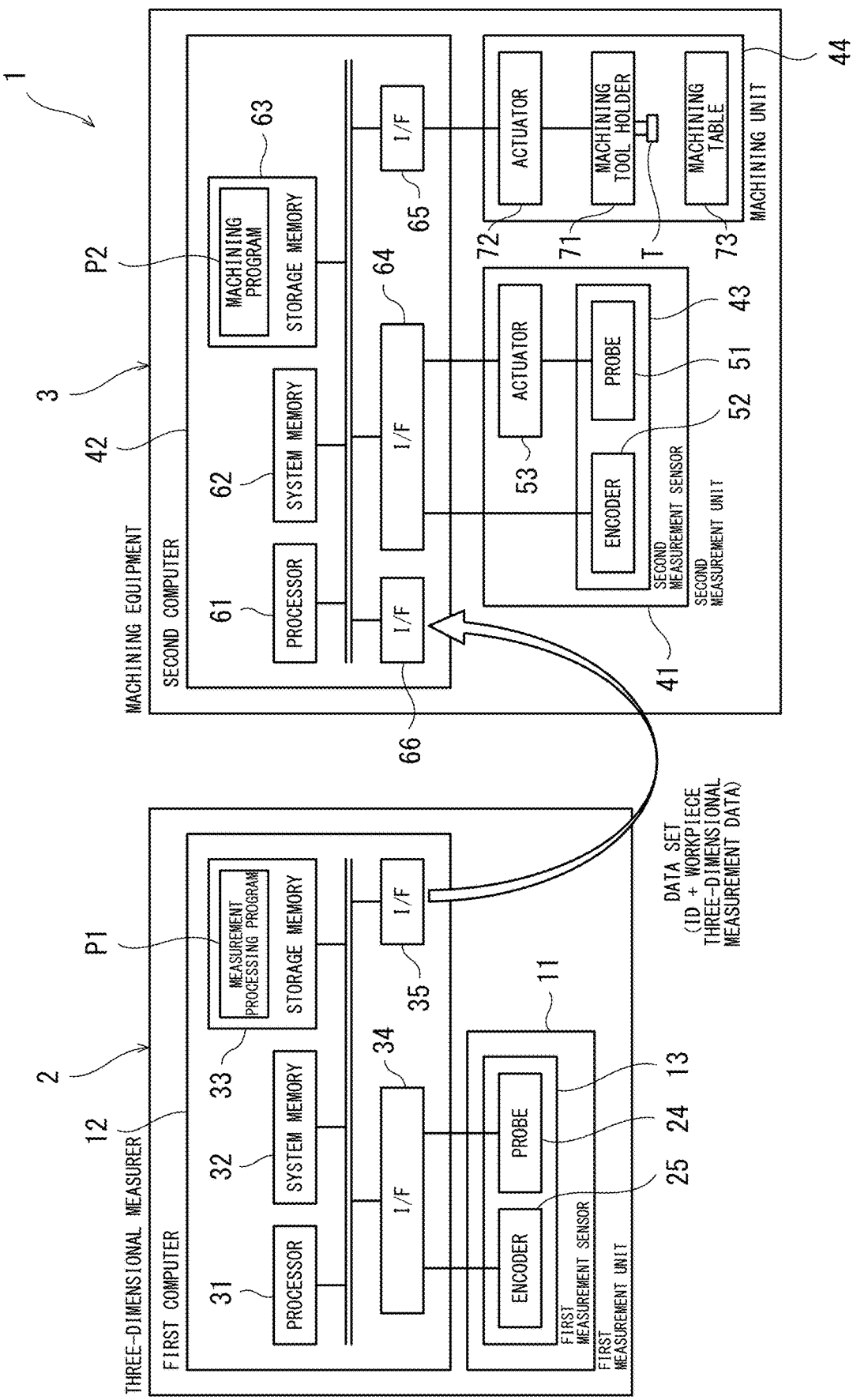
FIG. 1 is a block diagram of a structural object manufacturing system.

FIG. 1 is a block diagram of a structural object manufacturing system 1. The manufacturing system 1 manufactures structural objects by machining workpieces made of metal. The structural objects are not especially limited and may be, for example, railcar bogie frames. As shown in FIG. 1, the manufacturing system 1 includes a three-dimensional measurer 2 and machining equipment 3. The three-dimensional measurer 2 is at, for example, a location away from a manufacturing line. To be specific, the three-dimensional measurer 2 may measure the three-dimensional shapes of the workpieces independently from the flow of the manufacturing line. The machining equipment 3 is at a predetermined location on the manufacturing line.

Figure 2:
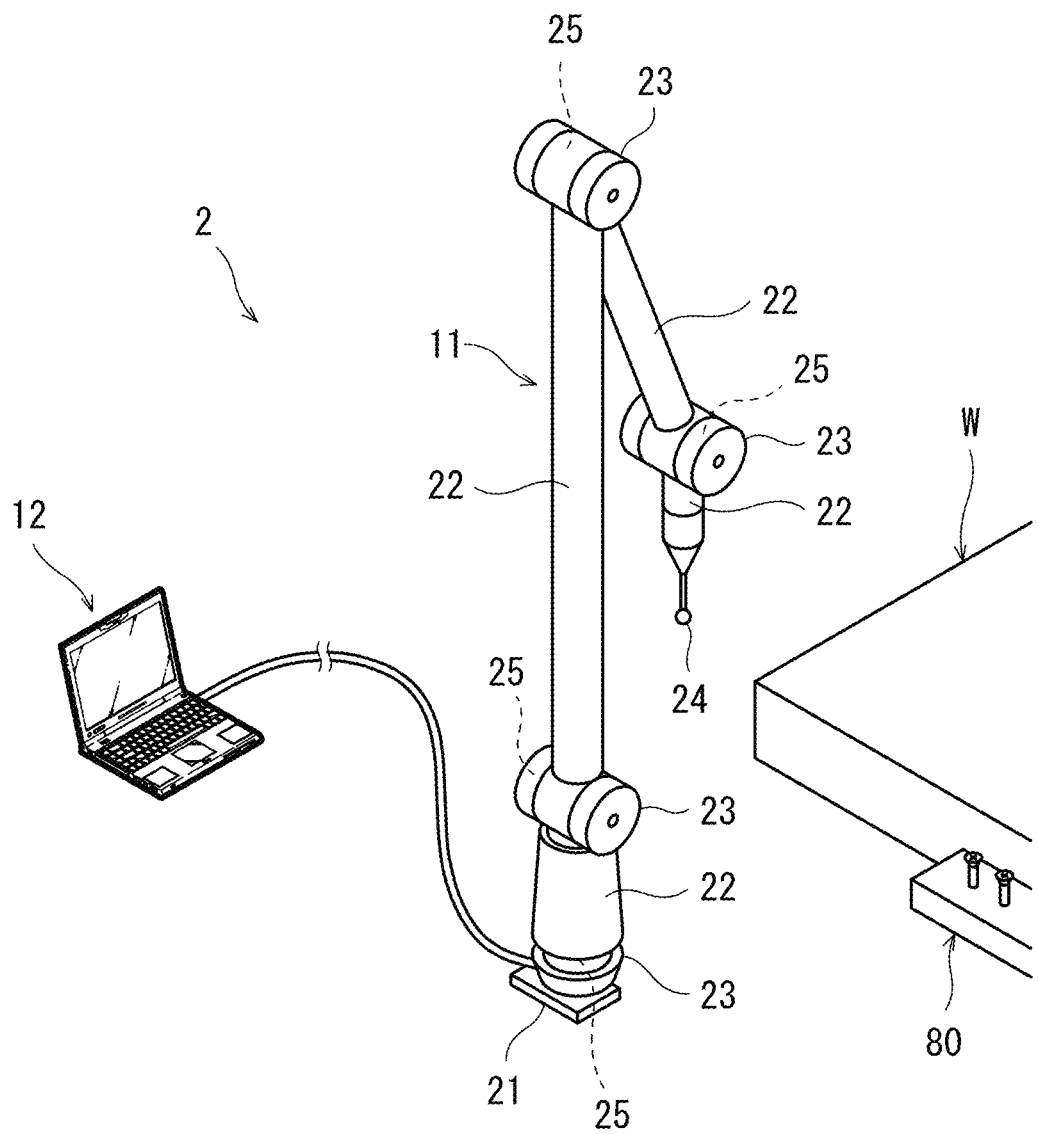
FIG. 2 is a perspective view of a three-dimensional measurer.

FIG. 2 is a perspective view of the three-dimensional measurer 2. As shown in FIG. 2, the three-dimensional measurer 2 includes a first measurement unit 11. The first measurement unit 11 is of an articulated arm type as one example but is not limited to this and may be of a scanning type, for example. The first measurement unit 11 includes a base 21, arms 22, joints 23, a probe 24, and encoders 25. A workpiece W is an intermediate product for manufacturing the structural object. An identifier 80 having a three-dimensional shape is detachably fixed to the workpiece W.

The base 21 is located on a floor surface, a fixing base, or the workpiece. The arms 22 are located in series from the base 21 as a base point. Each of the joints 23 couples the adjacent arms 22 to each other such that the arms 22 are angularly displaceable. The probe 24 is attached to the arm 22 located at a most tip side. The probe 24 is a touch sensor that generates a detection signal when the touch sensor contacts the workpiece W or the identifier 80. The encoders 25 are incorporated in the respective joints 23 and detects angular displacements of the corresponding joints 23.

The probe 24 of the first measurement unit 11 may be moved manually with a hand of an operator or may be moved automatically by an actuator controlled by a first computer 12. When the probe 24 is brought into point-contact with a surface of the workpiece W, a three-dimensional coordinate position of this contact point is measured. The three-dimensional measurer 2 includes the first computer 12 that is communicably connected to the first measurement unit 11. The first computer 12 is communicably connected to the first measurement unit 11 through wired communication or wireless communication.

Referring back to FIG. 1, the first computer 12 of the three-dimensional measurer 2 includes a processor 31, a system memory 32, a storage memory 33, an interface 34, and an interface 35. The processor 31 is, for example, a central processing unit (CPU). The processor 31 may be distributed to processors. The system memory 32 is, for example, a RAM. The storage memory 33 is an example of a computer-readable medium and is a non-transitory and tangible medium. The storage memory 33 may include a ROM. The storage memory 33 may include a hard disk, a flash memory, or a combination thereof.

The storage memory 33 stores a measurement processing program P1. A configuration in which the processor 31 executes the measurement processing program P1 read in the system memory 32 is an example of processing circuitry of the three-dimensional measurer 2. To be specific, the first computer 12 may be one example of first processing circuitry. Part of the measurement processing program P1 or the entire measurement processing program P1 may be executed by a processor of a server connected to the three-dimensional measurer through a network.

The probe 24 and the encoders 25 of the first measurement unit 11 constitute a first measurement sensor 13 of the three-dimensional measurer 2. The interface 34 is a communication interface that receives a touch detection signal from the probe 24 of the first measurement sensor 13 and receives displacement magnitude signals from the encoders 25 of the first measurement sensor 13. The interface 35 is an I/O interface that outputs a below-described data set for the machining equipment 3.

A three-dimensional measuring method of the three-dimensional measurer 2 is not limited to a contact-type method, such as a method performed by the first measurement sensor 13, and may be a noncontact-type method. For example, the three-dimensional measuring method of the three-dimensional measurer 2 may be a laser-type method of scanning a target object with laser light, obtaining reflected light, and acquiring three-dimensional coordinates of a surface of the target object from the reflected light. The three-dimensional measuring method of the three-dimensional measurer 2 may be an image-type method of taking an image of a target object, irradiated with stripe-pattern light, with a camera and acquiring the three-dimensional shape of the target object from the image of the target object based on a phase shift method.

The machining equipment 3 includes a second measurement unit 41, a second computer 42, and a second measurement sensor 43. The second measurement unit 41 includes the second measurement sensor 43 and actuators 53. The second measurement sensor 43 includes a probe 51 and encoders 52. The probe 51 is a touch sensor that generates a detection signal when the touch sensor contacts the workpiece W or the identifier 80 (see FIG. 1). The probe 51 is moved by the actuators 53 in a three-dimensional manner. The encoders 52 detect operation amounts of the corresponding actuators 53.

The second computer 42 of the machining equipment 3 includes a processor 61, a system memory 62, a storage memory 63, an interface 64, an interface 65, and an interface 66. The processor 61 is, for example, a central processing unit (CPU). The processor 61 may be distributed to processors. The system memory 62 is, for example, a RAM. The storage memory 63 is an example of a computer-readable medium and is a non-transitory and tangible medium. The storage memory 63 may include a ROM. The storage memory 63 may include a hard disk, a flash memory, or a combination thereof.

The storage memory 63 stores a machining program P2. A configuration in which the processor 61 executes the machining program P2 read in the system memory 62 is an example of processing circuitry of the machining equipment 3. To be specific, the second computer 42 may be one example of second processing circuitry. Part of the machining program P2 or the entire machining program P2 may be executed by a processor of a server connected to the machining equipment through a network.

The probe 51 and the encoders 52 of the second measurement unit 41 constitute the second measurement sensor 43 of the machining equipment 3. The interface 64 of the second computer 42 is a communication interface that receives a touch detection signal from the probe 51 of the second measurement sensor 43 and receives displacement magnitude signals from the encoders 52 of the second measurement sensor 43.

A three-dimensional measuring method of the machining equipment 3 is not limited to a contact-type method, such as a method performed by the second measurement unit 41, and may be a noncontact-type method. For example, the three-dimensional measuring method of the machining equipment 3 may be a laser-type method of scanning a target object with laser light, obtaining reflected light, and acquiring three-dimensional coordinates of a surface of the target object from the reflected light. The three-dimensional measuring method of the machining equipment 3 may be an image-type method of taking an image of a target object, irradiated with stripe-pattern light, with a camera and acquiring the three-dimensional shape of the target object from the image of the target object based on a phase shift method.

A machining unit 44 includes a machining tool holder 71, actuators 72, and a machining table 73. The machining tool holder 71 replaceably holds a machining tool T for cutting. The actuators 72 include: an actuator that rotates the machining tool holder 71 holding the machining tool T to rotate the machining tool T around its own axis; and an actuator that displaces the machining tool holder 71 holding the machining tool T relative to the machining table 73. The machining table 73 includes a jig that positions the workpiece. The jig of the machining table 73 can perform position adjustment like a jack, for example. To be specific, the position and posture of the workpiece are adjusted by adjusting the jig of the machining table 73. The actuators 72 may be located at the machining table 73.

The interface 65 of the second computer 42 outputs a drive command, generated by the processor 61, to the actuators 72 in accordance with the machining program P2. The interface 64 is an I/O interface to which a below-described data set output from the interface 35 of the three-dimensional measurer 2 is input. The interface 35 of the first computer 12 and the interface 66 of the second computer 42 may be connected to each other through a network and be able to perform data communication. The interface 35 of the first computer 12 and the interface 66 of the second computer 42 may be connected to each other in a peer-to-peer manner so as to be able to perform data communication. A data set may be output from the interface 35 of the first computer 12 to a portable storage medium, and the data set may be input to the interface 66 of the second computer 42 from the portable storage medium.

Figure 3:
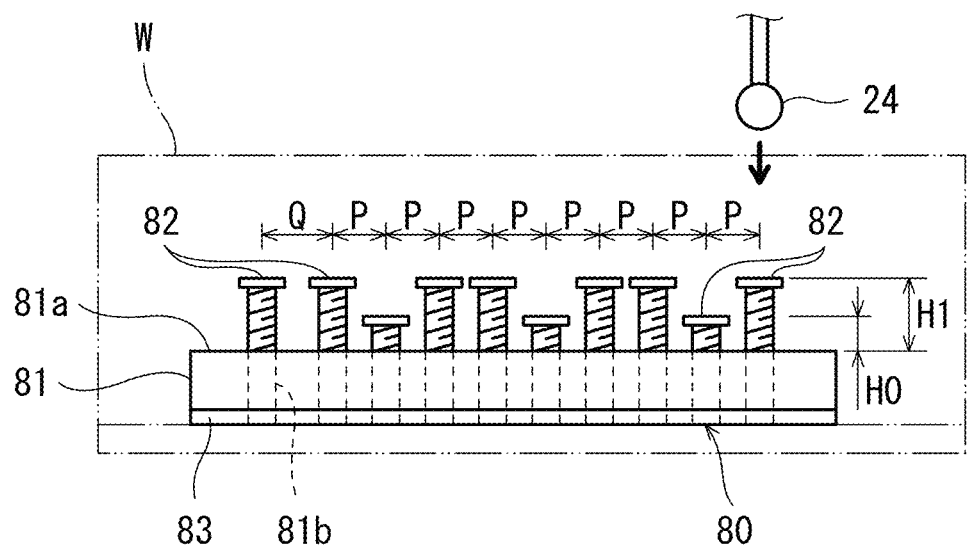
FIG. 3 is a side view of an identifier.

FIG. 3 is a side view of the identifier 80. As shown in FIG. 3, the identifier 80 includes projections or recesses. As one example, the identifier 80 includes a base 81, identification screws 82, and an adsorbing body 83. The base 81 is, for example, a metal plate. The base 81 includes a base surface 81a as a main surface and screw holes 81b that are open on the base surface 81a. The adsorbing body 83 is, for example, a magnet fixed to the base 81. Since the adsorbing body 83 is adsorbed to the workpiece W made of metal, the base 81 is detachably attached to the workpiece W.

Each identification screw 82 is one example of the projection located at the base 81. The identification screws 82 are threadedly engaged with the corresponding screw holes 81b from the base surface 81a. A projection amount of each identification screw 82 projecting from the base surface 81a can be mechanically changed by tightening or loosening the identification screw 82. The identification screw 82 serves as both of the projection located at the base 81 and an adjuster that can change the projection amount of this projection.

The projection amount of each identification screw 82 is determined in accordance with identification information to be expressed by the identifier 80. For example, the identification screw 82 having a projection amount H1 denotes "1" as a binary number, and the identification screw 82 having a projection amount H0 smaller than the projection amount H1 denotes "0" as the binary number. The identification screw 82 having the projection amount H1 may denote "0" as the binary number, and the identification screw 82 having the projection amount H0 may denote "1" as the binary number. Moreover, in the present embodiment, the projection amounts of the identification screws 82 are represented by two stages corresponding to the binary number but may be represented by N stages (N>2) corresponding to an N-ary number (N>2).

Regarding arrangement pitches of the identification screws 82, for example, only one pitch at one end of a row of the identification screws 82 may be a different pitch Q, and the remaining pitches may be equal pitches P. For example, in the row of the identification screws 82, the identification screw 82 at a right end in FIG. 3 may be represented by a minimum digit of the binary number, and the identification screw 82 at a left end of FIG. 3 may be represented by a maximum digit of the binary number. To be specific, in the row of the identification screws 82, the identification screw 82 located at the end at the pitch Q may be defined as an end point. In contrast, in the row of the identification screws 82, the identification screw 82 located at the end at the pitch Q may be defined as a start point.

When the probe 24 (see FIGS. 1 and 2) of the three-dimensional measurer 2 touches a head top surface of the identification screw 82 of the identifier 80, the first computer 12 can detect the three-dimensional coordinates of the head top surface of the identification screw 82 and acquire the projection amount of the identification screw 82. At this time, since only the pitch Q at one end of the row of the identification screws 82 is different from the other pitches, the start point and end point of the row of the identification screws 82 whose projection amounts have been acquired can be properly recognized.

The identifier may not include the adjuster. To be specific, the projection amount of the projection of the identifier or the recess amount of the recess of the identifier may be unchanging. For example, the projection may be integrally molded with the base. The identifier may be integrally molded with the workpiece and may be cut off from the workpiece in a post-process. The identifier may be used for purposes other than the identification of the workpiece. For example, the identifier may be attached to a jig for manufacturing the structural object and used for the identification of the jig.

Figure 4:
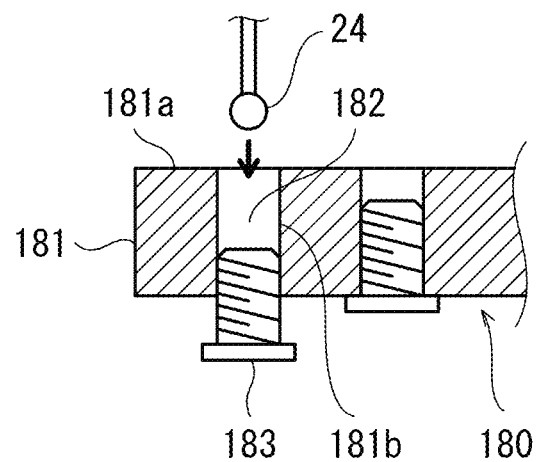
FIG. 4 is a sectional view of a first modified example of the identifier of FIG. 3.

FIG. 4 is a sectional view of a first modified example of the identifier of FIG. 3. As shown in FIG. 4, an identifier 180 of the first modified example includes a base 181, recesses 182, and identification screws 183. The adsorbing body 83 is not shown. The base 181 is, for example, a metal plate. The base 181 includes a base surface 181*a* as a main surface and screw holes 181*b* that are open on the base surface 181*a*. The identification screws 183 are threadedly engaged with the corresponding screw holes 181*b* from a rear surface opposite to the base surface 181*a*. To be specific, an axial end surface of the identification screw 183 defines a bottom surface of the screw hole 181*b*, and a recess 182 that is recessed from the base surface 181*a* is defined in the screw hole 181*b*. The recess amount of the recess 182 can be mechanically changed by tightening or loosening the identification screw 183. The identification screw 183 serves as both of the bottom surface of the recess 182 located at the base 181 and an adjuster that can change the recess amount of the recess 182.

The recess amount of the recess 182 is determined in accordance with the identification information expressed by the identifier 180. When the probe 24 (see FIGS. 1 and 2) of the three-dimensional measurer 2 touches the bottom surface of the recess 182 of the identifier 180, the first computer 12 can detect the three-dimensional coordinates of the bottom surface of the recess 182 and acquire the recess amount of the recess 182.

Figure 5:
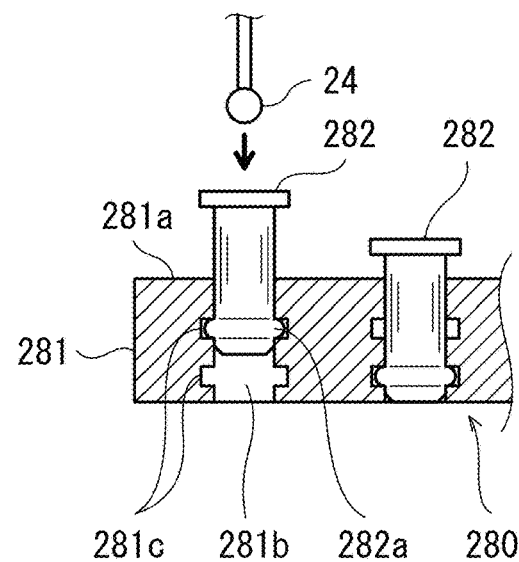
FIG. 5 is a perspective view of a second modified example of the identifier of FIG. 3.

FIG. 5 is a sectional view of a second modified example of the identifier of FIG. 3. As shown in FIG. 5, an identifier 280 of the second modified example includes a base 281 and rods 282. The adsorbing body 83 is not shown. The base 281 is, for example, a metal plate. The base 281 includes a base surface 281*a* as a main surface and holes 281*b* that are open on the base surface 281*a*. Each rod 282 is one example of the projection located at the base 281. The rod 282 includes a locking portion 282*a* projecting in a direction orthogonal to an axis of the rod 282. An inner peripheral surface of the hole 281*b* includes locked portions 281*c* separately located along an axis of the hole 281*b*.

The rods 282 are inserted into the corresponding holes 281*b* from the base surface 281*a*. The locking portion 282*a* of the rod 282 is locked to one of the locked portions 281*c*. The projection amount of the rod 282 projecting from the base surface 81*a* can be mechanically changed by pushing in the rod 282 or pulling out the rob 282. To be specific, the projection amount of the rod 282 based on the base surface 281*a* is determined by selecting the locked portion 281*c* to which the locking portion 282*a* is locked. The rod 282 serves as both of the projection located at the base 281 and an adjuster that can change the projection amount of this projection.

When the probe 24 (see FIGS. 1 and 2) of the three-dimensional measurer 2 touches the head top surface of the rod 282 of the identifier 280, the first computer 12 can detect the three-dimensional coordinates of the head top surface of the rod 282 and acquire the projection amount of the rod 282.

Figure 6:
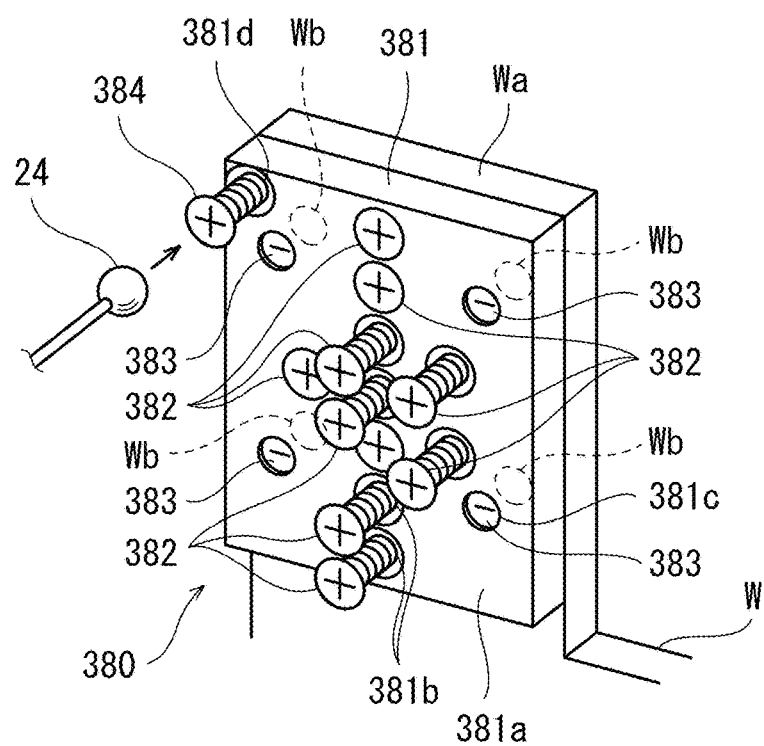
FIG. 6 is a perspective view of a third modified example of the identifier of FIG. 3.

FIG. 6 is a perspective view of a third modified example of the identifier of FIG. 3. As shown in FIG. 6, an identifier 380 includes a base 381, identification screws 382, fixing screws 383, and a reference screw 384. The base 381 is, for example, a metal plate. The base 381 includes a base surface 381*a* as a main surface, identification screw holes 381*b* that are open on the base surface 381*a*, fixing screw holes 381*c* that are open on the base surface 381*a*, and a reference screw hole 381*d* that is open on the base surface 381*a*.

Each identification screw 382 is one example of the projection located at the base 381. The identification screws 382 are threadedly engaged with the corresponding identification screw holes 381*b* from the base surface 381*a*. The projection amount of the identification screw 382 projecting from the base surface 381*a* can be mechanically changed by tightening or loosening the identification screw 382. The identification screw 382 serves as both of the projection located at the base 381 and an adjuster that can change the projection amount of this projection.

The reference screw hole 381*d* is located at a predetermined reference position of the base 381. The reference screw 384 is threadedly engaged with the reference screw hole 381*d*. Whether or not the identifier 380 is attached to an attached portion Wa in a correct direction can be confirmed by the reference screw 384.

Figure 7A:
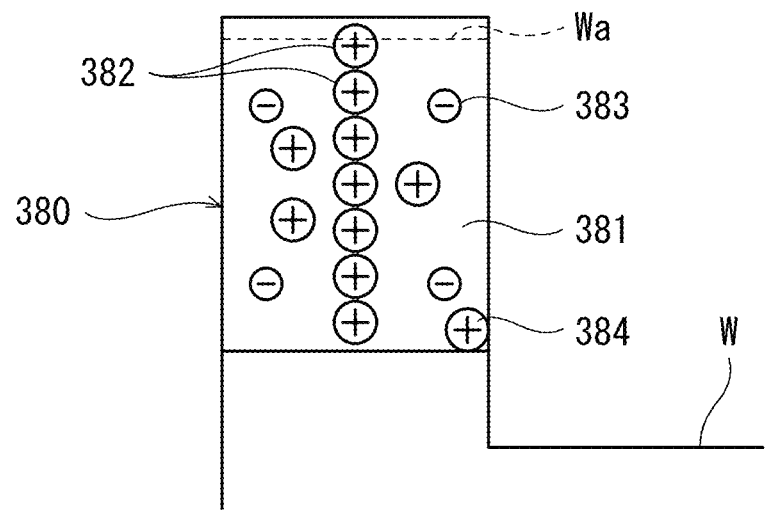
FIG. 7A is a front view for explaining an attaching error of the identifier of FIG. 6.
Figure 7B:
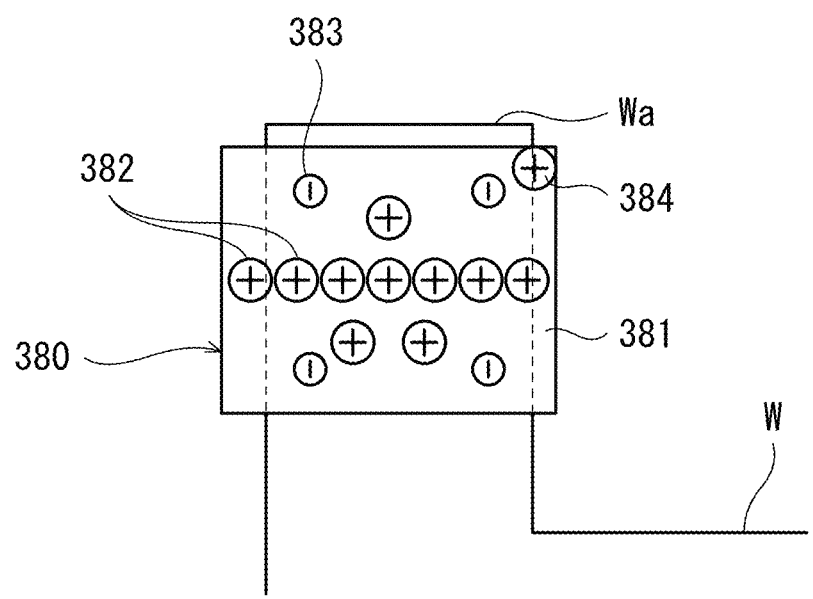
FIG. 7B is a front view for explaining the attaching error of the identifier of FIG. 6.

The attached portion Wa of the workpiece W includes fixing screw holes Wb corresponding to the fixing screw holes 381c of the base surface 381a. Each fixing screw 383 as one example of a fixture is inserted into the fixing screw hole 381c of the base 381 and the fixing screw hole Wb of the attached portion Wa, and thus, the base 381 is detachably fixed to the attached portion Wa. When the identifier 380 is attached to the attached portion Wa in the correct direction, the base 381 does not protrude from the attached portion Wa when viewed from a normal direction of the base 381. On the other hand, as shown in FIGS. 7A and 7B, when the identifier 380 is attached to the attached portion Wa in a wrong direction, the base 381 protrudes from the attached portion Wa when viewed from the normal direction of the base 381. Therefore, the operator can grasp the correct direction of the identifier 380 during the work of attaching the identifier 380 to the workpiece W.

When the probe 24 (see FIGS. 1 and 2) of the three-dimensional measurer 2 touches the head top surface of the identification screw 382, the first computer 12 can detect the three-dimensional coordinates of the head top surface of the identification screw 382 and acquire the projection amount of the identification screw 382. Moreover, when the probe 24 also touches the head top surface of the reference screw 384, the first computer 12 can detect the three-dimensional coordinates of the head top surface of the reference screw 384. When a positional relation between the reference screw 384 and the identification screw 382 is a predetermined relation, the first computer 12 determines that the identifier 380 is located in the correct direction. When the positional relation is not the predetermined relation, the first computer 12 determines that the identifier 380 is located in the wrong direction.

Figure 8:
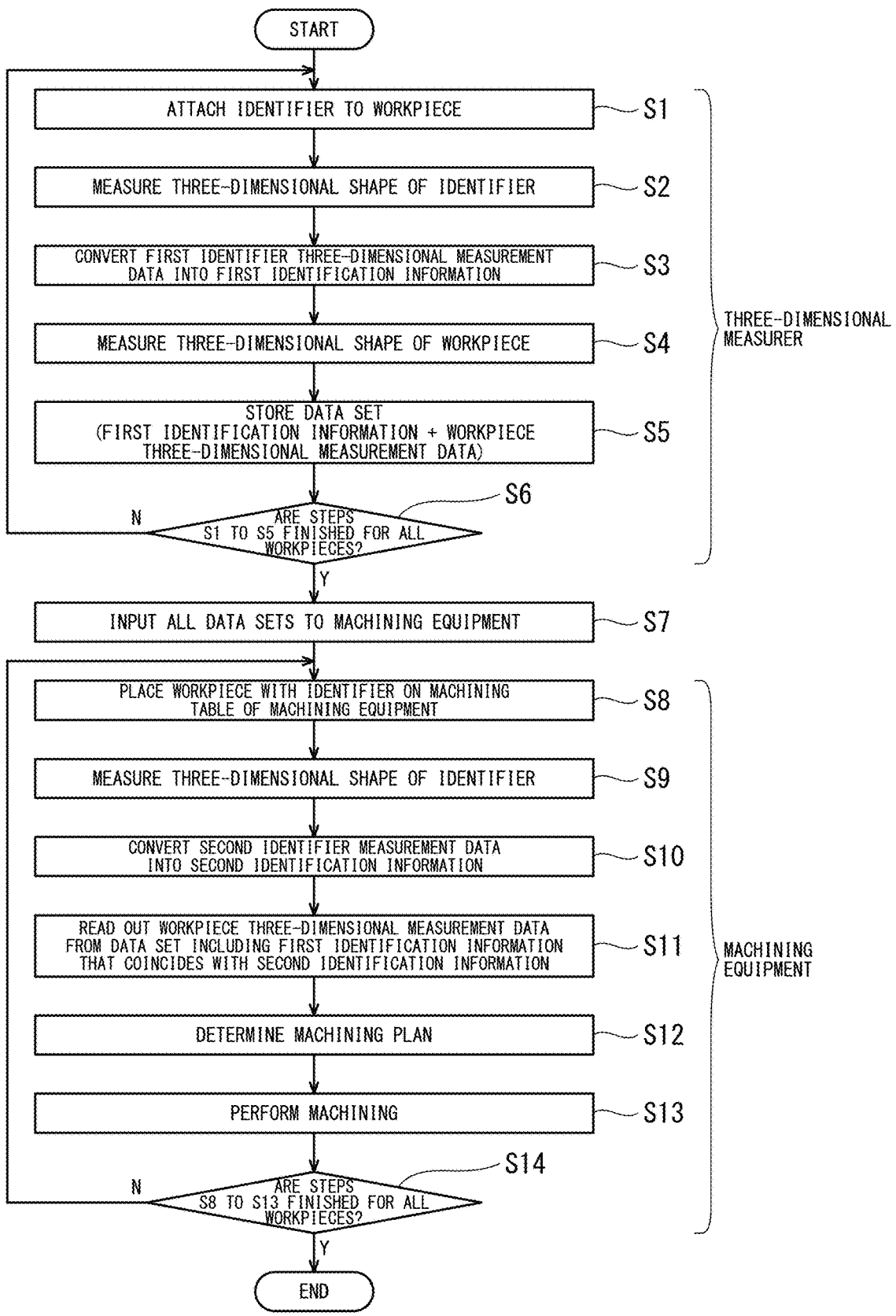
FIG. 8 is a flowchart for explaining the procedure of a method of manufacturing a structural object.

FIG. 8 is a flowchart for explaining a procedure of a method of manufacturing the structural object. Hereinafter, the manufacturing procedure will be described along the flow of FIG. 8 with suitable reference to FIG. 1, etc. The processor 31 of the three-dimensional measurer 2 operates in accordance with the measurement processing program P1 read in the system memory 32, and the processor 61 of the machining equipment 3 operates in accordance with the machining program P2 read in the system memory 62.

First, the identifier 80 (see FIG. 3) is attached to the workpiece W (Step S1). Next, first identifier three-dimensional measurement data is acquired by measuring the three-dimensional shape of the identifier 80 with the first measurement sensor 13 of the three-dimensional measurer 2 (Step S2). Specifically, the operator makes the probe 24 touch the head top surface of the identification screw 82 of the identifier 80. Each time the processor 31 of the three-dimensional measurer 2 receives the touch detection signal from the probe 24, the processor 31 stores in the storage memory 33 as the first identifier three-dimensional measurement data the three-dimensional coordinates grasped by the displacement magnitude signals from the encoders 25.

Next, the processor 31 converts the first identifier three-dimensional measurement data into first identification information based on a predetermined rule (Step S3). The predetermined rule includes: calculating the projection amount of each identification screw 82 from the three-dimensional coordinates of a point of the head top surface of the identification screw 82 which has been touched by the probe 24; and converting data of the calculated projection amounts into bit stream data. When the calculated projection amount is the projection amount H1, it is converted into "1." When the calculated projection amount is the projection amount H0, it is converted into "0."

FIG. 9 is a diagram showing data of the first identification information. The "projections" shown in FIG. 9 denote the identification screws 82. The bit stream data obtained by the above conversion in accordance with the predetermined rule is shown by the binary number. However, the processor 31 may convert the bit stream data into a decimal number and store it in the storage memory 33.

Next, workpiece three-dimensional measurement data is acquired by measuring the three-dimensional shape of the workpiece W with the first measurement sensor 13 of the three-dimensional measurer 2 (Step S4). Specifically, the operator makes the probe 24 touch the workpiece W. Each time the processor 31 receives the touch detection signal from the probe 24, the processor 31 stores in the storage memory 33 as the workpiece three-dimensional measurement data the three-dimensional coordinates grasped by the displacement magnitude signals from the encoders 25. The three-dimensional shape of the identifier 80 may be measured after the three-dimensional shape of the workpiece W is measured. Moreover, the three-dimensional shape of the identifier 80 may be measured while the three-dimensional shape of the workpiece W is being measured. The order of the measurement is not limited.

Next, the processor 31 associates the workpiece three-dimensional measurement data with the first identification information and stores them in the storage memory 33. To be specific, the storage memory 33 stores a data set including the workpiece three-dimensional measurement data and the first identification information associated with the workpiece three-dimensional measurement data (Step S5).

Instead of the identification information, other specific information may be associated with the workpiece three-dimensional measurement data. For example, the identifier three-dimensional measurement data itself may be associated as the specific information with the workpiece three-dimensional measurement data, or contour data obtained by the three-dimensional measurement of the identifier may be associated as the specific information with the workpiece three-dimensional measurement data.

When Steps S1 to S5 are not finished yet for all of the workpieces W (No in Step S6), Steps S1 to S5 are performed for the remaining workpieces W. When Steps S1 to S5 are finished for all of the workpieces W (Yes in Step S6), the process proceeds to the machining performed by the machining equipment 3. Even when Steps S1 to S5 are not finished yet for all of the workpieces W, the workpieces W which have been subjected to Steps S1 to S5 may proceed to the machining performed by the machining equipment 3.

Next, all of the data sets acquired by repeatedly performing Steps S1 to S5 are output from the interface 35 of the three-dimensional measurer 2, and the output data sets are input to the interface 66 of the machining equipment 3 and stored in the storage memory 63 (Step S7).

Figure 10:
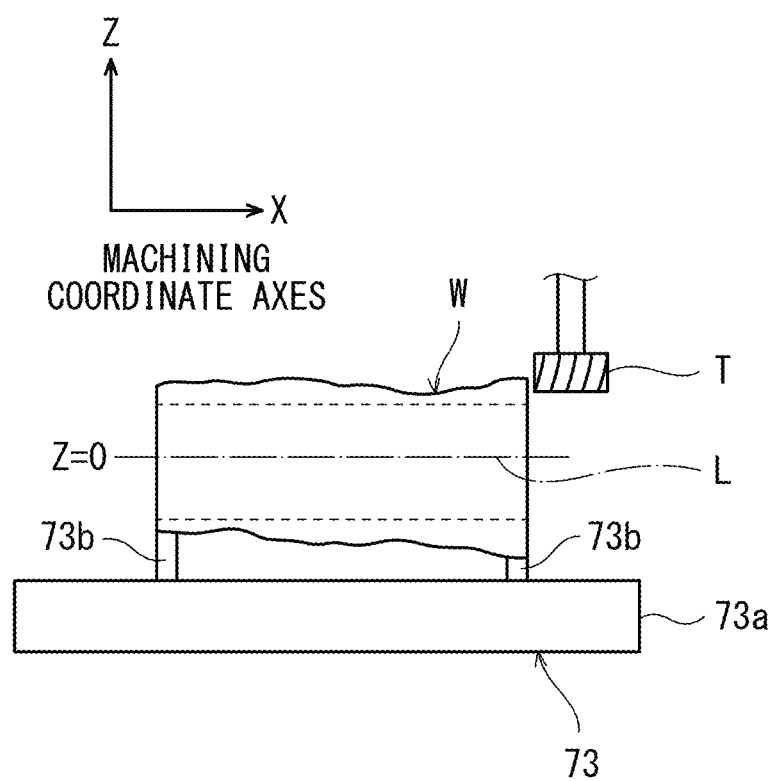
FIG. 10 is a diagram for explaining position adjustment of a workpiece by a machining table.

Next, the workpiece W to which the identifier 80 has been attached is placed on the machining table 73 of the machining equipment 3 (Step S8). As shown in FIG. 10, the machining table 73 includes, for example, a table 73a and jigs 73b located at the table 73a. The jigs 73b can perform position adjustment like a jack. The processor 61 calculates a machining reference line L of the workpiece W based on the read workpiece three-dimensional measurement data. The machining reference line L is a virtual line that serves as a reference of dimensions (dimensions along a Z axis in FIG. 10) of respective portions of the machined workpiece W. To be specific, the dimensions of the respective portions of the machined workpiece W are determined by distances from the machining reference line L. The processor 61 calculates position adjustment amounts of the jigs 73*b* such that the calculated machining reference line L is perpendicular to one (Z axis in FIG. 10) of machining coordinate axes of the machining equipment 3. Regarding the machining coordinate axes of the machining equipment 3, a cutting depth direction of the machining performed by the machining tool T is set as the Z axis.

The processor 61 outputs the calculated position adjustment amounts of the jigs 73*b*. For example, the processor 61 displays the calculated position adjustment amounts of the jigs 73*b* as guidance on a display, and the operator manually adjusts the jigs 73*b* in accordance with the guidance. Therefore, the operator does not have to do trial and error of the adjustment of the installation posture of the workpiece W, and this can reduce the work time. Or, when the worktable 73 is configured such that the position adjustments of the jigs 73*b* can be performed by a jig actuator, the processor 61 may drive the jig actuator in accordance with the calculated position adjustment amounts of the jigs 73*b*.

The processor 61 may set the machining coordinate axes of the machining equipment 3 based on the read workpiece three-dimensional measurement data such that one (Z axis in FIG. 10) of the machining coordinate axes of the machining equipment 3 is perpendicular to the machining reference line L of the workpiece W. Thus, the jigs 73*b* do not have to be adjusted, and this can further reduce the work time.

Next, the three-dimensional shape of the identifier 80 is measured by the second measurement sensor 43 of the machining equipment 3 and stored as second identifier three-dimensional measurement data in the storage memory 63 or the system memory 62 (Step S9). Since the principle of the measurement of the three-dimensional shape of the identifier 80 by the second measurement sensor 43 is the same as the principle of the measurement of the three-dimensional shape of the identifier 80 by the first measurement sensor 13, detailed explanations thereof are omitted.

Next, the processor 61 of the machining equipment 3 converts the second identifier three-dimensional measurement data into second identification information based on the predetermined rule (Step S10). Since the principle of the conversion from the second identifier three-dimensional measurement data to the second identification information is the same as the principle of the conversion from the first identifier three-dimensional measurement data to the first identification information, detailed explanations thereof are omitted.

Next, from all of the data sets stored in the storage memory 63, the processor 61 reads out in the system memory 62 the workpiece three-dimensional measurement data of the data set including the first identification information that coincides with the second identification information obtained by the conversion from the second identifier three-dimensional measurement data (Step S11).

Next, the processor 61 determines a machining plan based on the read workpiece three-dimensional measurement data (Step S12). The machining plan includes various conditions. For example, the machining plan may include the machining allowance of the workpiece W. The processor 61 calculates machining allowances of respective cutting target portions of the workpiece W based on the read workpiece three-dimensional measurement data such that the shape of the machined workpiece W becomes a target shape.

The machining plan may further include relative positions of the workpiece W located at the machining table 73 and a machining operation start point of the machining tool T. The processor 61 of the machining equipment 3 controls the actuators 72 to adjust the machining operation start point of the machining tool T based on the read workpiece three-dimensional measurement data such that a gap between the cutting target portion of the workpiece W and the machining operation start point of the machining tool T becomes a below-described appropriate gap shown in FIG. 11C. Herein, the "machining operation start point" denotes a position where the machining equipment 3 makes the machining tool T start a cutting operation. For example, the processor 61 controls the actuators 72 such that the machining tool T is moved from a tool stand-by position to the machining operation start point without being rotated, and the rotation of the machining tool T is started from the machining operation start point.

The machining plan may further include an angle of the machining tool T. The processor 61 calculates the angle of the machining tool T in operation based on the read workpiece three-dimensional measurement data such that the posture of the machining tool T relative to the direction of the cutting target portion of the workpiece W located at the machining table 73 becomes a predetermined posture.

The machining plan may further include a cutting depth of the machining tool T per one pass and a feed speed of the machining tool T per one pass. When the machining allowance of the workpiece W exceeds a maximum capability value of the cutting depth of the machining tool T per one pass, the machining tool T needs to reciprocate along the surface of the workpiece W to perform the cutting operation. Herein, "one pass" denotes that the machining tool T moves once in one direction while cutting the surface of the workpiece W. When the machining tool T performs the cutting operation by reciprocating along the surface of the workpiece W located on the machining table 73, the processor 61 determines, as the cutting depth based on the read workpiece three-dimensional measurement data, a value obtained by equally dividing the machining allowance of the workpiece W as described below with reference to FIG. 12C. The processor 61 determines the feed speed of the machining tool T per one pass such that the feed speed increases as the cutting depth decreases.

Next, the processor 61 controls the actuators 72 in accordance with the determined machining plan to execute the cutting operation of the workpiece W (Step S13). When Steps S8 to S13 are not finished yet for all of the workpieces W (No in Step S14), Steps S8 to S13 are performed for the remaining workpieces W. When Steps S8 to S13 are finished for all of the workpieces W (Yes in Step S14), the machining by the machining equipment 3 is terminated.

Figure 11A:
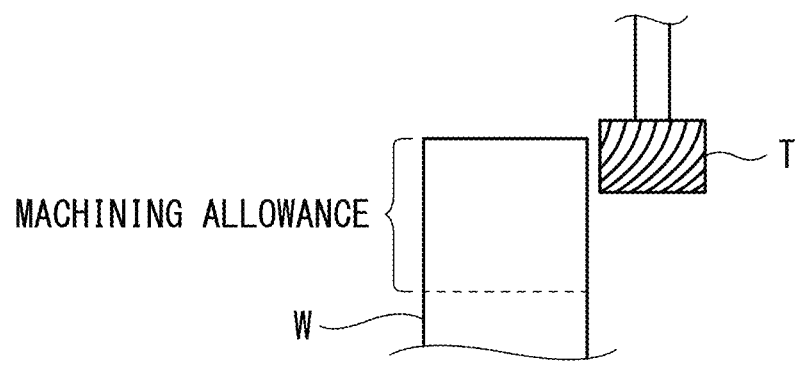
FIG. 11A is a diagram for explaining a conventional example in which a machining allowance is large.
Figure 11B:
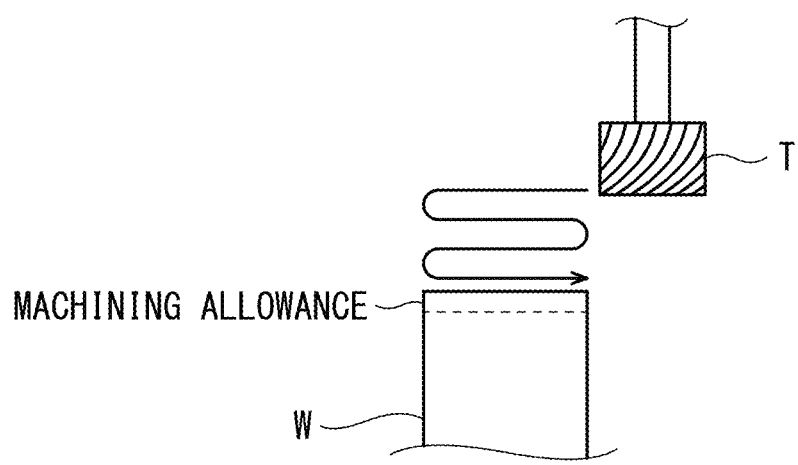
FIG. 11B is a diagram for explaining a conventional example in which the machining allowance is small.
Figure 11C:
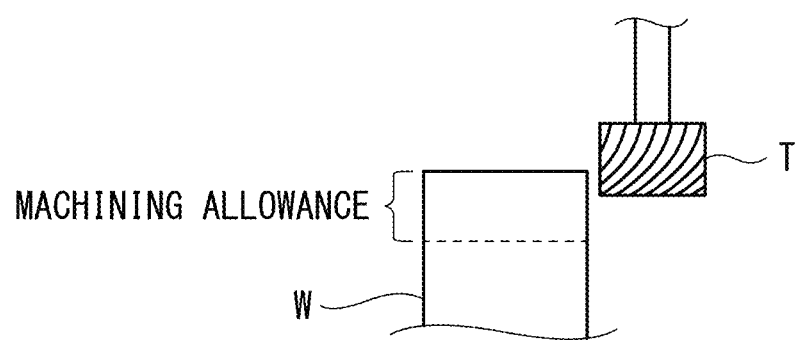
FIG. 11C is a diagram for explaining an example in which a machining operation start point of a machining tool is appropriate.

FIG. 11A is a diagram for explaining a conventional example in which the machining allowance is large. FIG. 11B is a diagram for explaining a conventional example in which the machining allowance is small. FIG. 11C is a diagram for explaining an example in which the machining operation start point of the machining tool is appropriate. As shown in FIG. 11A, there was a possibility that when the machining allowance of the workpiece W is excessively large, conventionally, the machining operation start point of the machining tool T is excessively close to the workpiece W, and the machining tool T interferes with the workpiece W. On the other hand, as shown in FIG. 11B, there was a possibility that when the machining allowance of the workpiece W is excessively small, conventionally, the machining operation start point of the machining tool T is too far from the workpiece W, and therefore, wasteful operation that does not realize machining is performed in several passes until the machining tool T actually reaches the workpiece W from the start of the machining operation, and this increases the machining time.

On the other hand, in the present embodiment, the processor 61 of the machining equipment 3 determines the relative positions of the workpiece W located at the machining table 73 and the machining operation start point of the machining tool T based on the read workpiece three-dimensional measurement data. Therefore, as shown in FIG. 1C, the gap between the cutting target portion of the workpiece W and the machining operation start point of the machining tool T becomes an appropriate gap. Thus, the interference is prevented, and the occurrence of the wasteful operation is prevented.

Figure 12A:
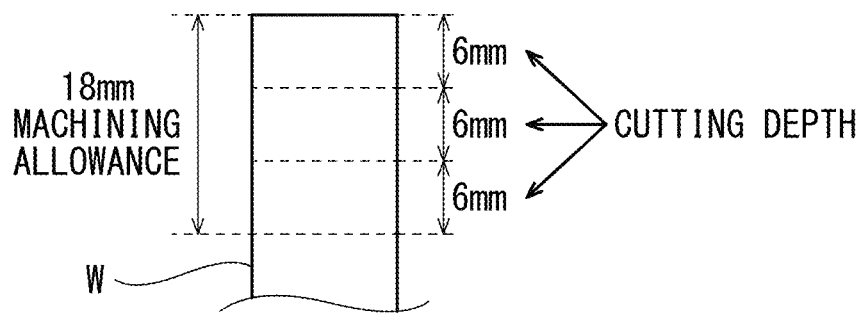
FIG. 12A is a diagram for explaining an example in which a maximum capability of the machining tool can be exerted in all of passes.
Figure 12B:
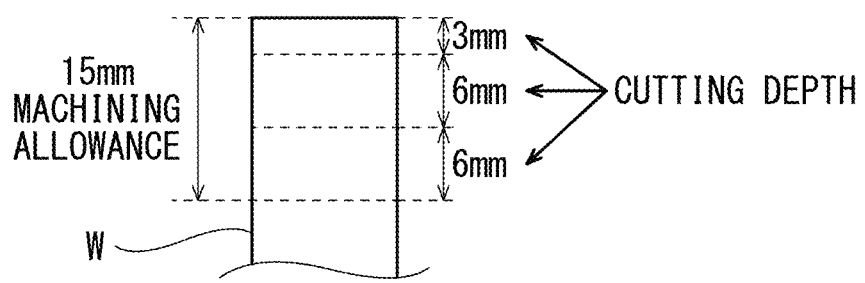
FIG. 12B is a diagram for explaining an example in which the maximum capability of the machining tool cannot be exerted in a first pass.
Figure 12C:
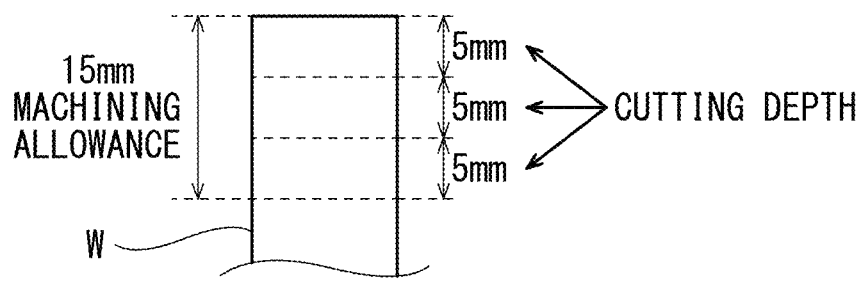
FIG. 12C is a diagram for explaining an example in which the machining allowance is the same as that in FIG. 12B, and cutting depths in all of the passes are equal to each other.

FIG. 12A is a diagram for explaining an example in which the maximum capability of the machining tool T can be exerted in all of the passes. FIG. 12B is a diagram for explaining an example in which the maximum capability of the machining tool T cannot be exerted in a first pass. FIG. 12C is a diagram for explaining an example in which the machining allowance is the same as that in FIG. 12B, and cutting depths in all of the passes are equal to each other. In the explanations related to FIGS. 12A to 12C, the maximum capability value of the cutting depth of the machining tool T per one pass is assumed to be 6 mm. As shown in FIG. 12A, for example, when the machining allowance of the workpiece W is 18 mm, the machining allowance is a multiple of the maximum capability value of the cutting depth. Therefore, the maximum capability of the machining tool T is exerted in all of the passes, and the machining efficiency becomes the highest.

As shown in FIG. 12B, for example, when the machining allowance of the workpiece W is 15 mm, the machining allowance is not a multiple of the maximum capability value of the cutting depth. In this case, conventionally, the cutting depth in the first pass is 3 mm, and the cutting depth in each of the remaining passes is 6 mm. Therefore, the capability of the machining tool T cannot be significantly exerted in the first pass, and this deteriorates the machining efficiency.

On the other hand, in the present embodiment, the processor 61 determines, as the cutting depth based on the read workpiece three-dimensional measurement data, a value obtained by equally dividing the machining allowance of the workpiece W. Therefore, as shown in FIG. 12C, when the machining allowance is 15 mm, the cutting depths in each of all of the passes is 5 mm. Then, the processor 61 determines the feed speed of the machining tool T per one pass such that the feed speed increases as the cutting depth decreases. Therefore, the feed speed of the machining tool T is higher than that when the cutting depth is 6 mm. As above, the capability close to the maximum capability of the machining tool T can be exerted in all of the passes. Thus, the machining efficiency improves, and the machining time is reduced.

According to the above-described embodiment, the machining equipment 3 reads out the previously acquired workpiece three-dimensional measurement data based on the identifier 80 attached to the workpiece W. Therefore, a mistake of reading out the workpiece three-dimensional measurement data that does not correspond to the workpiece W to be actually machined can be prevented. The three-dimensional measurer 2 recognizes the identifier 80 by using the first measurement sensor 13 that measures the three-dimensional shape of the workpiece W. Therefore, it is unnecessary to newly prepare a reader that recognizes the identifier 80, and this can reduce the cost.

Since the machining allowance of the workpiece W is determined based on the workpiece three-dimensional measurement data, appropriate machining can be performed for each of the workpieces W.

The relative positions of the workpiece W located at the machining table 73 and the machining operation start point of the machining tool T are determined based on the workpiece three-dimensional measurement data. Therefore, the machining tool T can be prevented from interfering with the workpiece W at the machining operation start point. In addition, the occurrence of the wasteful operation caused by the excessive gap between the workpiece W and the machining operation start point is prevented, and this can reduce the machining time.

The angle of the machining tool T is determined based on the workpiece three-dimensional measurement data. Therefore, regardless of the differences of the installation postures of the workpieces W due to the individual differences of the workpieces W, the machining can be performed in a state where the posture of the machining tool T is appropriately set for each of the workpieces W.

The cutting depth of the machining tool T per one pass is determined as a value obtained by equally dividing the machining allowance of the workpiece W, and the feed speed of the machining tool T per one pass is set to increase as the cutting depth decreases. Therefore, the capability close to the maximum capability of the machining tool T is exerted. Thus, the machining efficiency improves, and the machining time can be reduced.

The identifier three-dimensional measurement data is converted into the identification information based on the predetermined rule. Therefore, the machining program P2 that reads out the workpiece three-dimensional measurement data corresponding to the actual workpiece W located at the machining equipment 3 can be simplified.

The projection amounts of the identification screws 82 of the identifier 80 are converted into the bit stream data. Thus, the workpiece W can be identified by the identifier 80 having a simple structure.

The projection amounts of the identification screws 82 of the identifier 80 can be mechanically changed. Therefore, the identification information included in the identifier 80 can be easily changed.

The identifier 80 includes the adsorbing body 83 or the fixing screws 383 attachable to and detachable from the workpiece W. Therefore, the identifier 80 can be stably located at the workpiece W, and the identifier 80 can be detached from the workpiece W and reutilized.

The first three-dimensional measurement data is acquired by measuring the three-dimensional shape of the identifier 80 with the first measurement sensor 13 of the three-dimensional measurer 2, and the workpiece three-dimensional measurement data is acquired by measuring the three-dimensional shape of the workpiece W with the first measurement sensor 13 of the three-dimensional measurer 2. Therefore, the work efficiency can be improved.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The invention claimed is:

1. A method of manufacturing a structural object by using machining equipment including a machining tool, the method comprising:
    receiving a data set including
        workpiece three-dimensional measurement data acquired by measuring a three-dimensional shape of a workpiece that is a machining target object and
        first specific information of first identifier three-dimensional measurement data which is acquired by measuring a three-dimensional shape of an identifier attached to the workpiece and is associated with the workpiece three-dimensional measurement data;
    acquiring second identifier three-dimensional measurement data by measuring the three-dimensional shape of the identifier;
    reading out the workpiece three-dimensional measurement data from the data set including the first specific information that coincides with second specific information of the acquired second identifier three-dimensional measurement data; and
    determining a machining plan based on the read workpiece three-dimensional measurement data.

2. The method according to claim 1, wherein the machining plan includes a machining allowance of the workpiece.

3. The method according to claim 1, wherein the machining plan includes relative positions of the workpiece and a machining operation start point of the machining tool.

4. The method according to claim 1, wherein the machining plan includes a relative angle between the workpiece and the machining tool.

5. The method according to claim 1, wherein:
    the machining plan includes
        a cutting depth of the machining tool per one pass when the machining tool reciprocates along a surface of the workpiece to perform a cutting operation and
        a feed speed of the machining tool per one pass;
    the cutting depth is determined as a value obtained by equally dividing a machining allowance of the workpiece till completion of machining; and
    the feed speed is determined as a speed that increases as the cutting depth decreases.

6. The method according to claim 1, further comprising:
    converting the second identifier three-dimensional measurement data into second identification information based on a predetermined rule,
    wherein:
        the first specific information of the first identifier three-dimensional measurement data is first identification information obtained by converting the first identifier three-dimensional measurement data based on the predetermined rule; and
        the second specific information of the second identifier three-dimensional measurement data is the second identification information obtained by the conversion based on the predetermined rule.

7. A structural object manufacturing system that manufactures a structural object by using machining equipment including a machining tool, the structural object manufacturing system comprising:
    a measurement sensor that measures a three-dimensional shape; and
    processing circuitry connected to the measurement sensor, wherein:
        the processing circuitry receives a data set including
            workpiece three-dimensional measurement data acquired by measuring the three-dimensional shape of a workpiece and
            first specific information of first identifier three-dimensional measurement data which is acquired by measuring the three-dimensional shape of an identifier attached to the workpiece and is associated with the workpiece three-dimensional measurement data;
        the processing circuitry acquires second identifier three-dimensional measurement data by measuring the three-dimensional shape of the identifier with the measurement sensor;
        the processing circuitry reads out the workpiece three-dimensional measurement data from the data set including the first specific information that coincides with second specific information of the second identifier three-dimensional measurement data; and
        the processing circuitry determines a machining plan based on the read workpiece three-dimensional measurement data.

8. The structural object manufacturing system according to claim 7, wherein the machining plan includes a machining allowance of the workpiece.

9. The structural object manufacturing system according to claim 7, wherein the machining plan includes relative positions of the workpiece and a machining operation start point of the machining tool.

10. The structural object manufacturing system according to claim 7, wherein the machining plan includes a relative angle between the workpiece and the machining tool.

11. The structural object manufacturing system according to claim 7, wherein:
    the machining plan includes
        a cutting depth of the machining tool per one pass when the machining tool reciprocates along a surface of the workpiece to perform a cutting operation and
        a feed speed of the machining tool per one pass;
    the cutting depth is determined as a value obtained by equally dividing a machining allowance of the workpiece till completion of machining; and
    the feed speed is determined as a speed that increases as the cutting depth decreases.

12. The structural object manufacturing system according to claim 7, wherein:
    the processing circuitry converts the second identifier three-dimensional measurement data into second identification information based on a predetermined rule;
    the first specific information of the first identifier three-dimensional measurement data is first identification information obtained by converting the first identifier three-dimensional measurement data based on the predetermined rule; and the second specific information of the second identifier three-dimensional measurement data is the second identification information obtained by the conversion by the processing circuitry based on the predetermined rule.

13. The structural object manufacturing system according to claim 12, wherein:

the identifier includes projections or recesses;

each of the first identification information and the second identification information includes bit stream data; and the predetermined rule includes a rule that converts projection amounts of the projections or recess amounts of the recesses into the bit stream data.

14. The structural object manufacturing system according to claim 13, wherein the identifier includes adjusters that mechanically change the projection amounts of the projections or the recess amounts of the recesses.

15. The structural object manufacturing system according to claim 7, wherein the identifier includes an adsorbing body or a fixture attachable to and detachable from the workpiece.

16. The structural object manufacturing system according to claim 7, wherein:

the measurement sensor is a second measurement sensor;

the processing circuitry is second processing circuitry;

the manufacturing system acquires the first identifier three-dimensional measurement data by measuring the three-dimensional shape of the identifier with a first measurement sensor of a three-dimensional measurer including the first measurement sensor and first processing circuitry;

the manufacturing system acquires the workpiece three-dimensional measurement data by measuring the three-dimensional shape of the workpiece with the first measurement sensor; and the manufacturing system associates the workpiece three-dimensional measurement data with the first specific information of the first identifier three-dimensional measurement data and outputs the data set by the first processing circuitry.

17. A non-transitory computer readable medium storing a machining program for use in manufacturing a structural object by using machining equipment including a machining tool, the machining program causing at least one processor to execute:

receiving a data set including
workpiece three-dimensional measurement data acquired by measuring a three-dimensional shape of a workpiece and
first specific information of first identifier three-dimensional measurement data which is acquired by measuring a three-dimensional shape of an identifier attached to the workpiece and is associated with the workpiece three-dimensional measurement data;

acquiring second specific information of second identifier three-dimensional measurement data by measuring the three-dimensional shape of the identifier with a measurement sensor of the machining equipment;

reading out the workpiece three-dimensional measurement data from the data set including the first specific information that coincides with the second specific information of the second identifier three-dimensional measurement data; and determining a machining plan based on the read workpiece three-dimensional measurement data.

* * * * *